2,985,275
Patented May 23, 1961

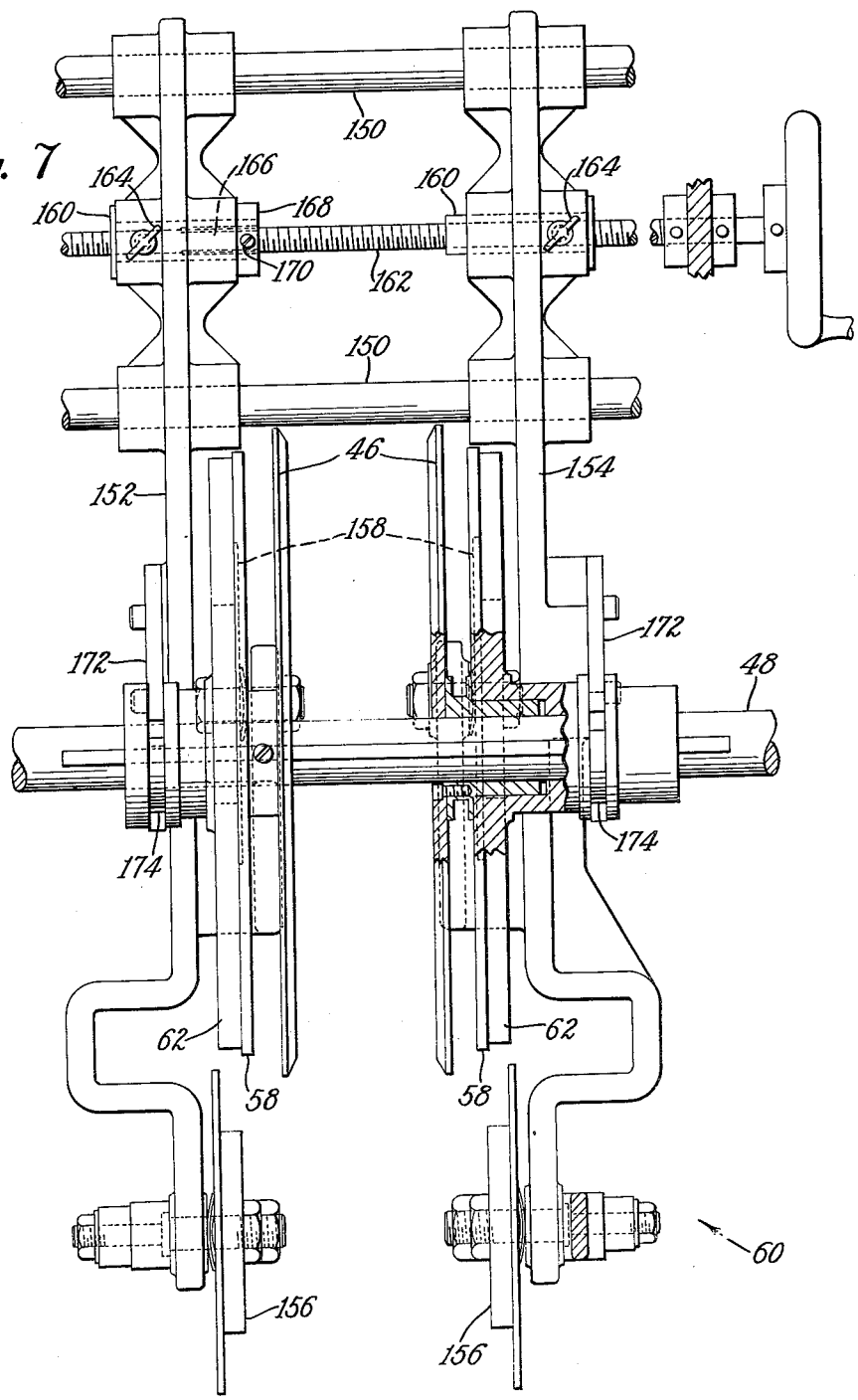

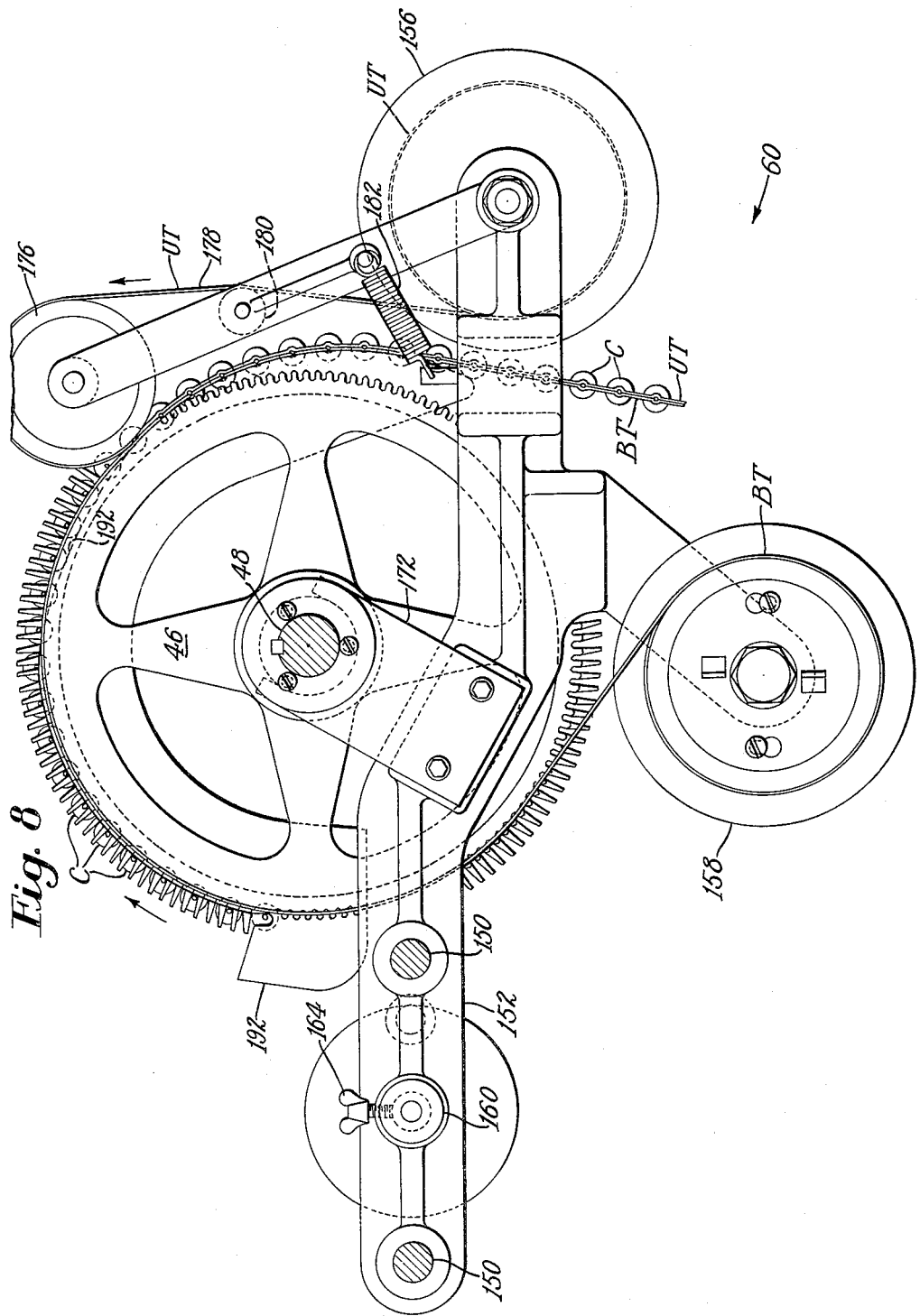

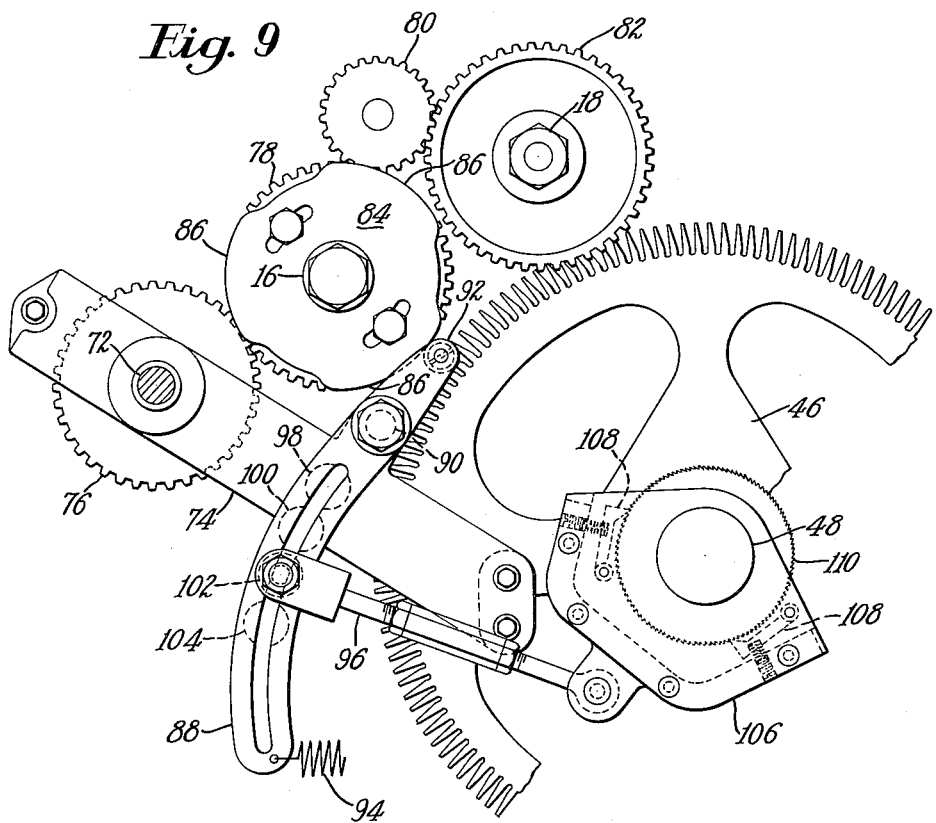

2,985,275

MECHANISM FOR FEEDING AXIAL COMPONENTS TO A CONVEYOR

Robert F. Lane, Beverly, Mass., assignor to United Shoe Machinery Corporation, Flemington, N.J., a corporation of New Jersey Filed May 29, 1958, Ser. No. 738,824

1 Claim. (Cl. 198—26)

This invention relates to machines for feeding articles in equispaced, side-by-side relation. More particularly, and as herein illustrated, the invention is concerned with the provision of improved mechanism for binding elongated objects of slender form, for instance, coaxial lead type electronic components, substantially the same distance apart from one another although the bodies of each lot may differ in diameter or width from another. Although the invention is here shown and described as applied to an organization for the straightening and belting of coaxial lead components, it will be appreciated that usage of the invention is not thus limited, nor is it restricted to operation on any particular type of elongated work piece, electrical or otherwise.

There is disclosed in United States Letters Patent No. 2,771,206, granted on November 20, 1956 upon an application filed in the name of Richard W. Daniels, Hammond P Diggle, and Bruce N. Smith, a machine capable of straightening the leads of coaxial type components and then belting them in a manner to facilitate their compact storage and/or individual successive application. Not only are very large quantities of such components employed in the electronic industry so that machines of the general type indicated are especially helpful to assemblers, but it is found that there are certain major size categories into which the most commonly used components ordinarily fall. In order to enable assemblers and/or component manufacturers better to straighten and belt these various component sizes in one conveniently adaptable machine, a modified design is disclosed in a copending application, Serial No. 601,787, filed August 2, 1956, in the name of Thomas W. Snow, now United States Letters Patent No. 2,858,873, granted November 4, 1958. It is a general object of the present invention to provide a still further improved machine of the type under consideration which shall incorporate added versatility for equispacing articles according to predetermined requirements as well as insure better and more dependably uniform bundling.

As machines of the type under consideration have heretofore been constructed, in order to process and belt components or other articles with a high volume output (of the order of 30–40,000 per hour), means has been arranged continuously to carry successive components from a loading zone to and through a tape applying zone. The component carrying means has normally comprised laterally spaced rows of lead engaging teeth, the teeth in each row being equispaced for the purpose of maintaining the leads and component bodies in parallel relation. Although machines of the type disclosed in the cited Snow application are adapted to process components of different body lengths, their lead spacing when taped has not generally been consistently uniform even though the body diameters or widths of a particular lot were substantially equal. A principal benefit to be derived from binding the components in a row should be, of course, that of invariably securing the leads of a given component size and shape in equispaced relation to facilitate and make more reliable their subsequent machine application. Preliminary lead straightening as hitherto disclosed is valuable in attaining uniform lead spacing, but it has been found that any placing of the components prior to taping which affords opportunity for their leads to bounce or go askew, and any movement of the lead carrying means as the leads are being received to be held for taping will considerably increase the chances of more leads being bound in nonparallel and irregularly spaced relation. In accordance with the above-stated object, and as a feature of this invention, there is provided in a machine, in combination with lead straightening means, a tape applying means, an intermittently operable lead carrying mechanism comprising equispaced teeth arranged to convey successive components from a receiving point closely adjacent to a discharge zone of the straightening means to the tape applying means, and means for changing the increment of feed of the lead carrying mechanism to enable successive straightened components to be received by the teeth when not in motion and then be carried in variable, equispaced relation to said tape applying means. As will hereinafter become apparent the novel organization of this invention thus advantageously achieves the desired spacing of bound leads without dependence upon a maintenance of uniformity of any dimension, such as the diameter, in the components themselves, a uniformity which is not too frequently realized commercially due to irregularities in body coatings of wax or other composition.

A further feature of the present invention resides in the provision, in a machine for binding articles in variable, equispaced relation, of intermittently movable toothed means for carrying the articles to and through a binding device, a pair of co-operative tools adapted to operate on the successive articles prior to their delivery to the toothed means, a raceway having a delivery end for feeding the articles successively to the tools, separating means operable adjacent to the raceway delivery end and actuatable by operation of one of the tools for timing the release of the components from the raceway and for controlling delivery of the successive articles from the tools to the toothed means, and mechanism for predeterminedly changing the speed of movement of the toothed means to enable it to receive the successive components in variable, equispaced relation.

The foregoing and other features of the invention, including various novel details of construction and arrangements of parts, will now be more fully described in connection with an illustrative embodiment and with reference to the accompanying drawings thereof, in which:

Fig. 7 is a plan view of tape applying means;

Fig. 8 is a view in side elevation showing the mounting of upper and lower tape applying means; and Fig. 9 is a view in side elevation of mechanism for intermittently advancing the straightened components through the tape applying means.

Figure 1:
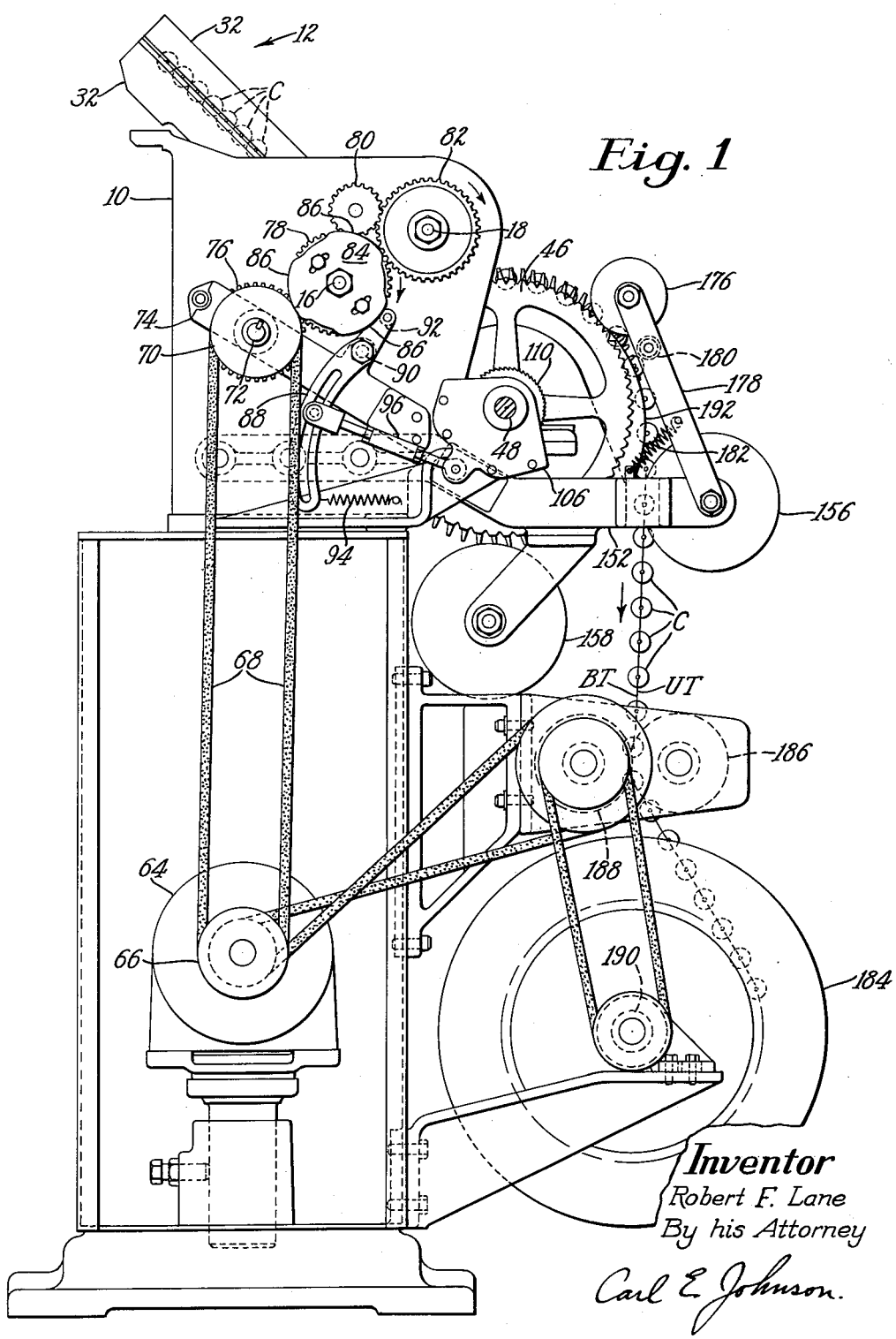
Fig. 1 is a view in side elevation of an illustrative machine for bundling electronic components.
Figure 2:
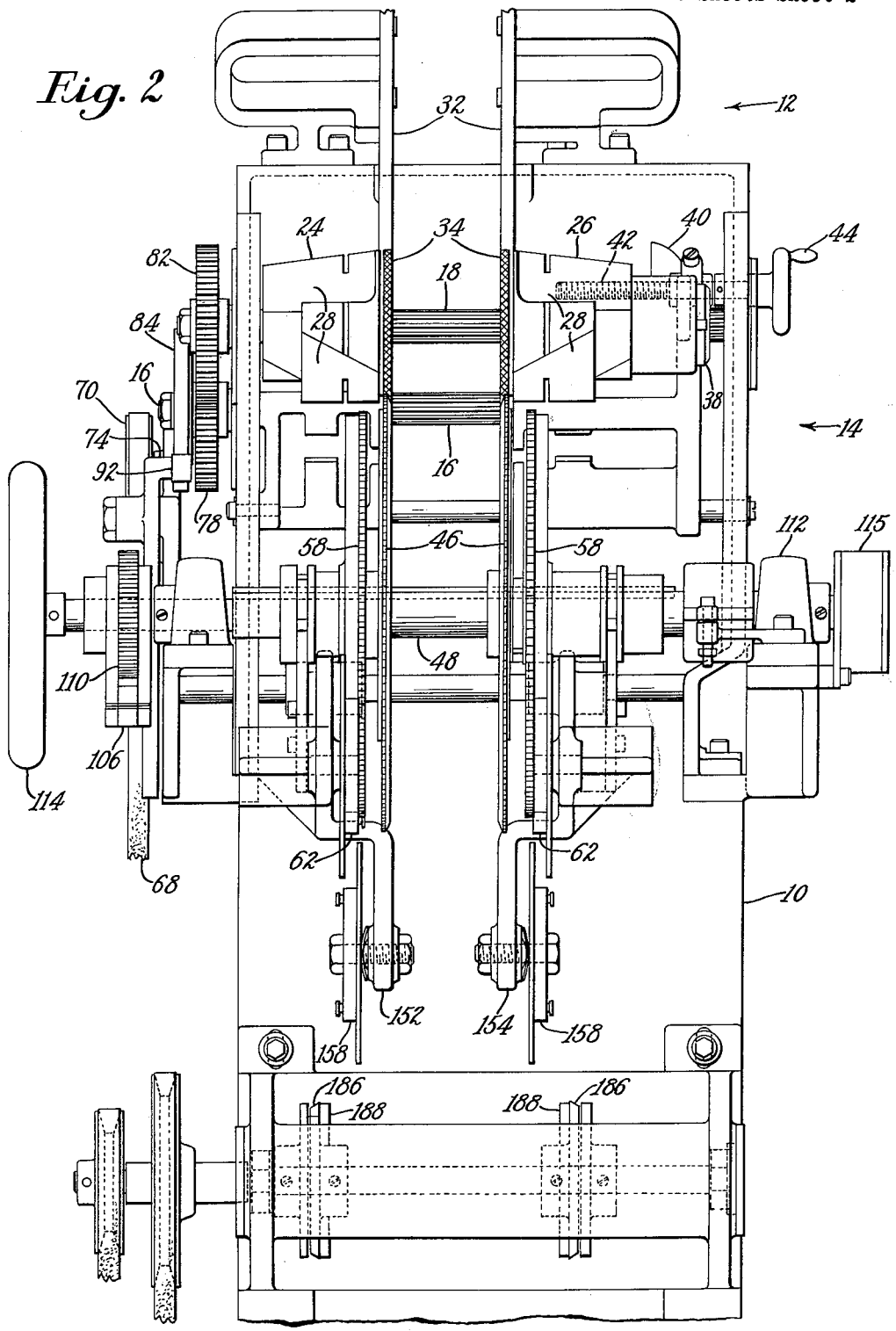
Fig. 2 is a view in front elevation of the upper portions of the machine of Fig. 1 and on a somewhat enlarged scale.
Figure 3:
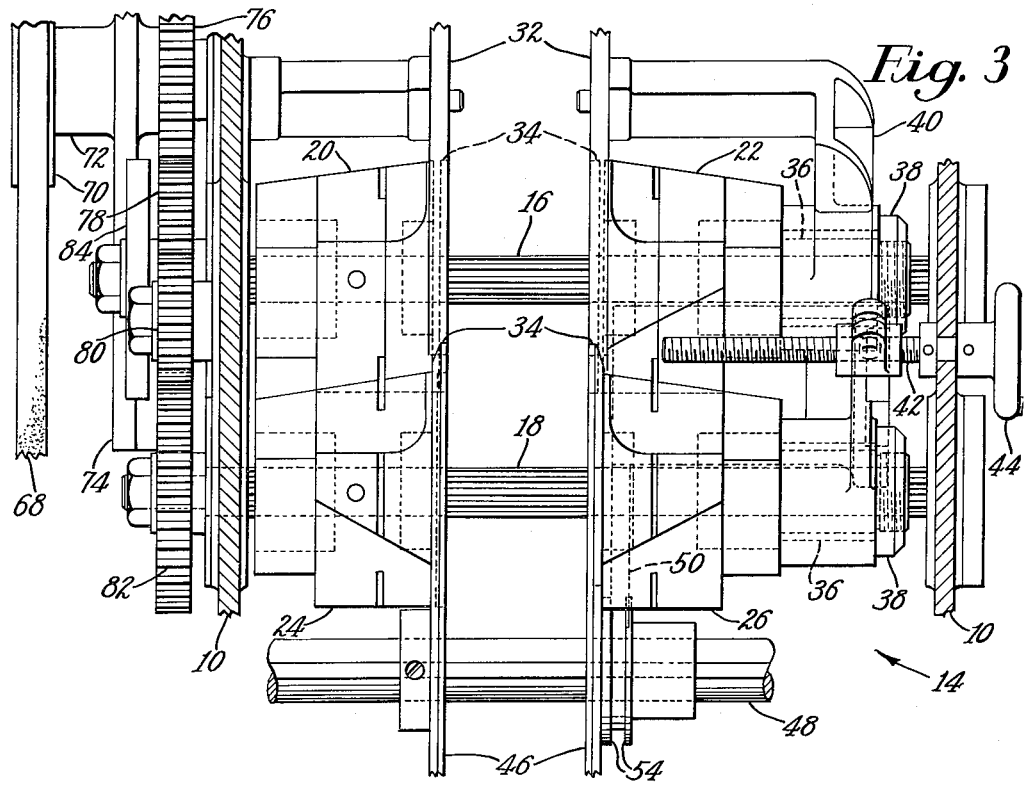
Fig. 3 is a plan view of co-operative lead straightening tools shown in Fig. 2 and showing the means for driving them and adjusting their spacing.
Figure 4:
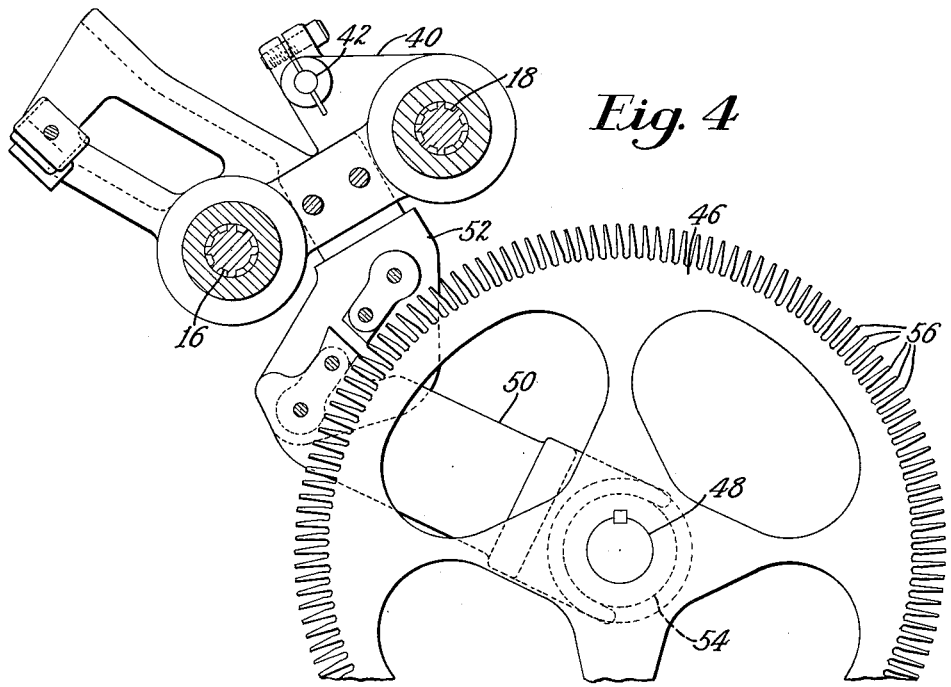
Fig. 4 is a view in side elevation of a pick-off wheel and other parts shown on the right hand side of Fig. 3.

The illustrative machine comprises a main frame 10 (Figs. 1 and 2) on which a raceway 12 is mounted and adapted to guide successive coaxial lead electronic components C, such as resistors, condensers or the like, to co-operative tools herein shown in the form of a lead straightening mechanism generally designated 14 (Figs. 2 and 3). For present purposes the straightening mechanism 14 herein shown is substantially like that disclosed and claimed in the co-pending Snow application referred to above, but it will be appreciated that any other suitable lead straightening means may, if desired, be incorporated in lieu thereof. Briefly, the mechanism 14 includes a pair of parallel splined shafts 16, 18 (Figs. 1 to 7 inclusive) rotatably journaled in the upper sides of the frame 10, and a pair of lead straightening rolls 20, 22 on the shaft 16 which are co-operative with a pair of rolls 24, 26, respectively, on the shaft 18. While these rolls are of the same general construction as those disclosed in the mentioned Snow application, and are rotated at the same speed and in the same direction in a corresponding mode of operation, they each preferably have three larger, though similarly shaped, lead straightening sectors 28 (Fig. 2) instead of four in order to insure adequate spinning of the leads and a longer opportunity for each lead to be straightened as it is spun. Each component is fed in succession from the raceway 12 whereupon separator means 30 (Figs. 5 and 6) later to be described, is effective to place the leads L of the components into spinning and straightening position wherein they are oppositely engaged by the co-operating sectors of the right hand or left hand rolls. It will be understood that, although not herein shown, means such as disclosed in the Snow application is provided for maintaining the successive leads in their roll engaging positions for the requisite interval of straightening.

In order to accommodate different sizes of component bodies means is provided for axially shifting the right hand rolls 22, 26 (as viewed in Figs. 2 and 3) relatively to the rolls 20, 24, the latter preferably being affixed to their respective shafts, and for correspondingly shifting pairs of oppositely disposed body guide or side rails 32 comprising the raceway 12. Adjacent to the inner ends of the respective rolls is a spinning disk 34 having a diameter equal to that of the rolls and preferably peripherally knurled or otherwise roughened to improve lead spinning action. The left hand disks 34 are fixedly secured to the splined shafts, respectively, and the right hand rolls 22, 26 are axially connected by bolts (not shown) to the right hand disks 34 which are respectively slidably splined on the shafts 16, 18. To effect the relative lateral adjusting movement of the rolls 22, 26, they are each provided with a sleeve 36 (Fig. 3) having threaded connection with spanner nuts 38, respectively, and a shifter yoke 40 mounted on the sleeves is thereby held against outer end faces of the rolls 22, 26. A jack screw 42 fixed against endwise movement in its bearing in the frame 10 and rotatable by means of a hand wheel 44 has threaded connection with the yoke. The jack screw thus serves axially to move in unison the rolls 22, 26, their adjacent disks 34, the right side rails 32 which are connected at their lower ends to the yoke 40, and the right pick-off wheel of a pair 46, 46 (Figs. 2–4) slidably mounted on an intermittently driven cross shaft 48 journaled in the frame. The right wheel 46 (Fig. 4) is laterally adjustable on its shaft by reason of an arm 50 being connected at its upper end by a bracket 52 to the yoke 40 and having a semicircular lower end disposed to be received within a groove 54 (Figs. 3 and 4) formed on the hub of the wheel. The wheels 46 are provided with axially alined lead receiving teeth 56 (Figs. 4–6) normally disposed to engage the leads adjacent to the respective ends of the component bodies. Also axially adjustable on the shaft 48 by means later explained, is a pair of pitch wheels 58, 58 (Figs. 2, 7) having a corresponding number of teeth normally disposed to engage the leads nearer their extremities. Both the wheels 46 and 58 are preferably of light weight metal to reduce momentum.

For driving the lead straightening mechanism 14, the separator means 30, and later described taping mechanism 60 (Fig. 7) co-operative with horizontal flanges 62 of the pitch wheels 58, respectively, a motor 64 (Fig. 1) is mounted in the base of the machine and provided with a double sheaved pulley 66. An endless belt 68 (Figs. 1, 2 and 3) on the pulley 66 extends over a pulley 70 secured on the outboard end of a stub shaft 72 journaled in the frame and in a supporting arm 74 bolted to the side of the frame. A gear 76 (Figs. 1 and 9) keyed on the stub shaft is arranged to mesh with a gear 78 on the shaft 16, and an idler gear 80 meshing with the gear 78 is disposed to impart rotation of the shaft 16, at the same speed and in the same direction, to the shaft 18 via a gear 82 thereon. For causing the shaft 48 to be rotated intermittently and with variable speeds, so as equally to space and appropriately position the components when straightened in every first, second, third or fourth of the lead receiving spaces afforded by the pickoff teeth 56, the wheels 46 and 58 being stopped to receive the successive components, an indexing ratchet mechanism next to be explained is driven by operation of the shaft 16. Secured on an end of the latter is a cam 84 (Figs. 1 and 9) formed with three peripheral, equispaced lobes 86. A lever 88 pivoted at 90 to the fixed arm 74 carries a roll 92 which is urged into operative engagement with the cam 84 by a tension spring 94 connecting the lower end of the lever 88 to the frame 10. Accordingly, as each lobe 86 swings the lever 88 clockwise (as viewed in Fig. 9) about its pivot 90, a link 96 connected at one end to the lever at either of its bores 98, 100, 102 or 104 (Fig. 9) and at its other end to a holder 106 for a pair of spring-backed pawls 108, 108, pivotally carried therein, is caused to move these pawls bodily clockwise, the holder being rotatably supported by the shaft 48. The pawls 108 are disposed to engage the biased teeth of a ratchet wheel 110 secured on the shaft 48 to effect its rotation, the pawls being effectively disengaged from the ratchet teeth upon their counterclockwise movement (as viewed in Fig. 9) in the interval when the portions of the cam 84 between lobes are being engaged by the roll 92. The arrangement is such that when the upper end of the link 96 is connected to the bore 98, successive lead receiving spaces between successive teeth 56 and corresponding pitch wheel teeth are positioned for the reception of a straightened component. If instead the link 96 be connected to the bore 100, 102 (as shown in Figs. 1, 9) or 104, as when accommodating component bodies of larger diameter or thickness, every successive second, third or fourth lead receiving space afforded by the teeth 56 will be positioned for the reception of a straightened component. In other words, an operator may by the optional connection, select an equispacing for the components appropriate to their body size or for their particular application. To insure that the wheels 46 and 58 will not have overtravel when they have been advanced to indexed position by the selected increment, a friction brake 112 (Fig. 2) is mounted on the frame 10 for engagement with one end of the shaft 48, and the other end of this shaft is provided with a hand wheel 114 for use in advancing the wheels 46, 58 clockwise (as seen in Fig. 9) if desired, independently of operation of the lead straightening means. To guard against retrograde movement of the wheels 46 and 58 means preferably in the form of a well known type of clutch 115 (Fig. 2) is secured to the frame for engagement with the shaft 48.

Figure 5:
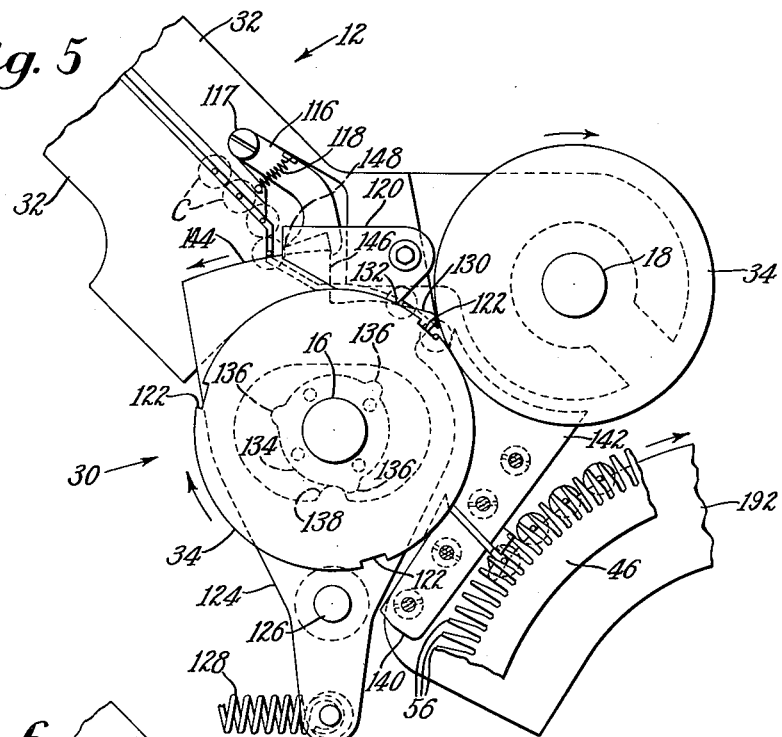
Fig. 5 is a view in side elevation of escapement or separating mechanism controlling feeding of successive components from a raceway and through the lead straightening zone to the pick-off wheels.
Figure 6:
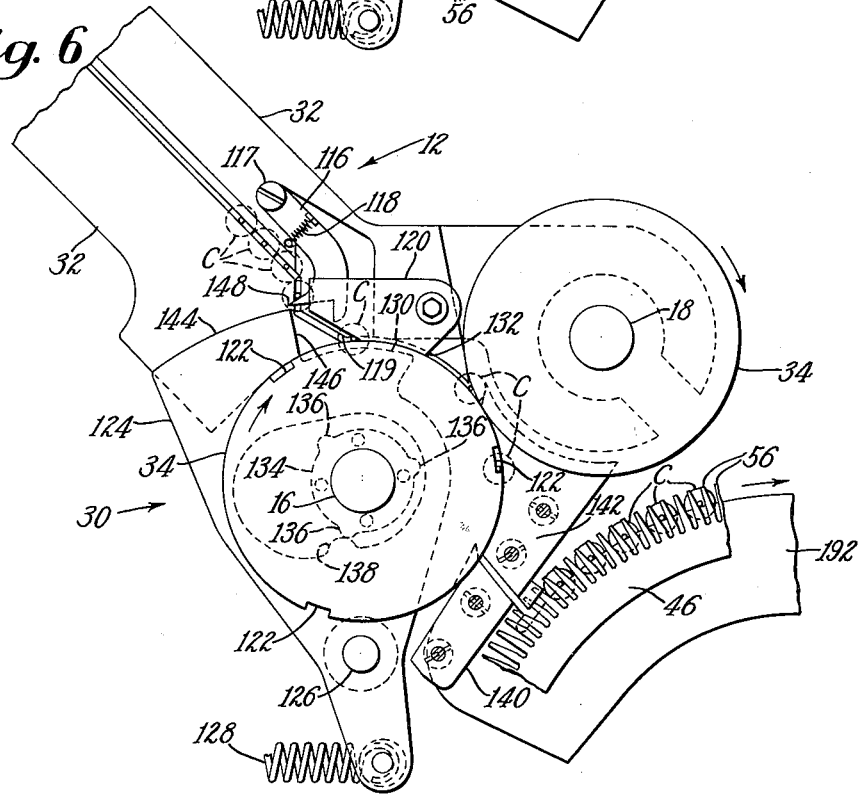
Fig. 6 is a view corresponding to Fig. 5 showing the parts at a different stage of operation.

Referring more particularly to Figs. 5 and 6, the separator means 30 now to be explained is operative to control delivery of the successive components from the lower end of the raceway 12, through the lead straightening mechanism 14, and into a position for loading into the proper stopped lead-receiving teeth. For this purpose a pair of detents 116, 116 respectively pivotally mounted at pivots 117 on the upper side rails 32 is urged by tension springs 118 into lead engaging position with respect to an endmost component, as shown in Fig. 6, to retain the series of components C in the raceway.

As further illustrated in Fig. 6 one component normally is then in lead straightening position between the cooperating straightening rolls, another and next to be straightened component at the delivery end of the raceway normally is then being held against advance with the rolls 20, 22 and their disks 34 by rearward corners 119 of a pair of spaced stop plates 120 (one only shown in Figs. 5 and 6) secured on the rails 32, respectively, and a third and just straightened component normally is being carried toward the pick-off and pitch wheels for loading. Movement and timing of the successive components to and through the lead straightening position is effected by means of three equispaced and alined peripheral slots 122 (Figs. 5 and 6) formed (preferably rectangular) in each of the lower spinning disks 34 in conjunction with a pair of oscillatory separator plates 124 (one only shown in Figs. 5 and 6). The slots 122 are located immediately adjacent to the wider or trailing end of each of the lead straightening sectors of the rollers and are axially alined with recessed portions of the latter. The plates 124 are rotatably supported on a rod 126 fixed in the frame, and are respectively urged clockwise as shown in Figs. 5 and 6 by a tension spring 128 connecting their lower ends to the frame. Fig. 5 depicts the extreme clockwise position of the plates 124, and Fig. 6 depicts their opposite position. As the upper slot 122 in Fig. 6 and its corresponding slot 122 (not shown) come beneath the detent-released component, they receive and carry it clockwise beneath and forwardly of the stop plates 120 and nearly to the lead straightening position causing its leads to ride upwardly out of the slots 122 and onto cam portions 130 (one only shown in Figs. 5 and 6) of the then stationary plates 124. Immediately thereafter the latter are together swung counterclockwise as viewed in Figs. 5 and 6 from their position shown in Fig. 5 by cam mechanism about to be described, and the arcuate surfaces 130 (eccentric with respect to the axis of the shaft 16) now move beneath and away from the leads of that raised component while it is momentarily trapped as indicated in Fig. 5. Front corners 132 (one only shown in Figs. 5 and 6) of the plates 120 serve to stop movement of the raised component away from the lead straightening zone. The alined slots 122 which have just advanced one component toward the straightening zone and been relieved of it now receive a preceding straightened component therefrom for movement between and beyond the straightening rolls, and the lower rolls act with the spinning disks 34 to move the just-raised component into the straightened position relatively to the upper straightening rolls. Simultaneous and intermittent clockwise movements of the plates 124 are caused against the resistance of the return springs 128 by a pair of timing rings 134 (one only shown in Figs. 5 and 6) which are fixed to the shaft 16 and each formed with cam projections 136 in phase with the slots 122 and respectively arranged to engage a cam 138 formed internally on the plates 124 respectively. The arrangement is such that when the leads of a component have been straightened by the co-operative action of lead straightening sectors of the rolls, the alined pair of slots 122 carries the component until it is separated from the disks 34 by the front ends of axially alined stripper plates 140, 140 (one only shown in Figs. 5 and 6). The upper inclined edges of the plates 140 and the parallel lower edges of a pair of axially spaced plates 142, 142 secured to the bracket 52 define a rather short delivery chute having an exit end adjacent to the pick-off wheels which are indexed for register therewith.

As will be apparent from Fig. 5, in the course of clockwise movements of each of the separator plates 124 a peripheral face 144 thereof is of sufficient length to retain the series of components in the raceway 12 while a radial face 146 of each of the plates 124 engages and displaces the detents 116, 116 counterclockwise (as viewed in Figs. 5 and 6) about their pivots 117, thus to permit a single component to descend beneath the level of acute projections 148, 148 of the detents which normally retain the components in the raceway. In the course of counterclockwise movements of the plates 124 the faces 146 permit return of the detents 116 to their usual retaining position and allow the single component which had descended as just mentioned to escape down onto the perimeter of the disks 34 as indicated in Fig. 6.

Now referring more especially to Figs. 7 and 8, means for bundling the straightened and equispaced components being conveyed by the wheels 46 and 58 is provided preferably in the form of the tape applying mechanism 60. The illustrative machine may optionally be fitted with means to lay tape across only the bodies of the row of components being conveyed but is herein shown as adapted to bind the leads with confronting pairs of upper and lower tapes UT and BT (Fig. 8). A pair of parallel cross rods 150, 150 (Figs. 1, 7, and 8) mounted in the frame 10 slidably carries castings 152, 154 (Fig. 8) which respectively support an upper tape supplying reel 156 and a lower tape supplying reel 158. At times it is desirable to maintain tape in fixed lateral position at one side of the row of component bodies being conveyed while shifting the lateral position of the tape at the other side, and at other times it is advantageous to be able correspondingly and simultaneously to shift the tape laterally on opposite sides of the row of bodies. For this purpose the castings 152, 154 are formed with coaxial bores for receiving flanged, internally threaded bushings 160 (Fig. 7) respectively. A manually operable jack screw 162 for laterally adjusting the reels 156, 158 is threaded through the bushings 160, 160 and secured against endwise movement in the frame 10. A clamping screw 164 threadedly extends through the castings 152 and 154 respectively for endwise engagement, if desired, with each of the bushings 160 thus insuring the movement of the castings with their bushings respectively. As shown in Fig. 7 the left-hand bushing 160 may be slotted axially to provide a resilient tongue 166. A collar 168 on this left-hand bushing threadedly receives a screw 170 which may be caused to bear on the tongue 166 and thus bind its bushing against travel on the jack screw. In this circumstance, the screw 164 being loosened to disengage it from the left-hand bushing 160, it will be apparent that the left-hand bushing merely rotates idly without the left-hand tapes being laterally shifted although rotation of the jack screw would then be laterally shifting the right-hand tapes. The castings 152, 154 respectively carry upwardly projecting arms 172, the semicircular upper ends of which are respectively received in slots 174 (Fig. 7) formed in hubs of the pitch wheels 58. Accordingly, lateral shifting of the tapes UT and BT correspondingly shifts the pitch wheel flanges 62, and a pair of presser rolls 176, 176 (Figs. 1 and 8) respectively co-operating therewith is rotatably carried at the upper ends, respectively, of arms 178, 178 pivotally supported on the front ends of the castings 152, 154. These presser rolls preferably are of rubber composition and peripherally slashed to improve the "wrapping effect" or embedding of the leads in the tapes. For guiding the tapes UT over the rolls 176 each of the arms 178 supports an idler roll 180. A tension spring 182 connecting each of the arms 178 with the frame provides suitable pressure being exerted by the presser rolls to insure that the pressure sensitive tapes will secure the components prior to their being accumulated on a detachable drum 184 (Fig. 1) rotatably mounted at the base of the machine. By belt and pulley connection with the motor 64 as illustrated in Figs. 1 and 2, two pairs of co-operative and laterally adjustable lead cutting disks 186, 188 may be employed to sever end portions of the successive bound leads prior to the components being wound on the drum 184, and the latter is driven frictionally through a simple slip-type clutch 190 (Fig. 1).

Operation of the machine, although perhaps clear from the foregoing will now be briefly reviewed. The tapes BT will first have been led over the pitch wheel flanges 62, 62 as indicated in Fig. 8, and the tapes UT will be drawn around the presser rolls 176, respectively, to overlie the tapes BT. In suitably preparing the machine for straightening and binding the components of a lot having a particular body length and width (or diameter), the jack screws 42 and 162 will be rotated as necessary laterally to space the raceway rails 32, the straightening rolls 20, 22 and 24, 26, the pick-off wheels 46, and the pitch wheels 58. Also, the link 96 should be connected to the lever 88 at one of the bores 98, 100, 102 or 104 as selected to cause appropriate spacing of the leads in the bundle to be assembled, greater body width normally requiring greater spacing between leads. With the raceway 12 loaded with components C, the motor 64 may now be started. As above described, successive pairs of alined spinning disk slots 122 receive and transfer a component from the corners 119 toward the operating zone of the straightening rolls, the separator plates 124 then having their cam surfaces 130 stationary, or nearly so, and positioned as shown in Fig. 5 for elevating that component from the mentioned slots 122 and enabling them, without stopping, to receive and advance a preceding component, if any, which will then have been straightened by the coacting sectors of the straightening rolls. It should be noted that preferably, when in their forward dwell position, the plates 124 each have a front radial edge disposed to engage and urge the leads of the component being spun into lead straightening position. As soon as the plates 124 have been swung counterclockwise (as viewed in Figs. 5 and 6) by the timed engagement of a projection 136 with the cam 138 so that the separator plate surfaces 130, 130 have cleared the forward corners 132, the next component to be straightened is permitted to occupy the lead straightening zone until the succeeding pair of slots 122 arrives to carry the component forwardly to the short exit channel defined by the plates 140, 142.

It should be noted that each component emerging from the exit channel referred to is not at first permitted to drop the full depth of the then stationary teeth 56 of the pick-off wheels 46 which are registered with the channel by the means above described. Instead, in order to avoid the possibility of a component being delivered from becoming cocked (due to bouncing or otherwise) and then held cocked upon contact with the adhesive upper surface of the lower tape BT, a pair of upright stripper plates 192, 192 (one only shown in Figs. 1, 5, 6 and 8) for determining heightwise position of the leads is secured to the bracket 52 and the plates extend closely adjacent to the pick-off wheels for lateral movement therewith. As can best be seen in Figs. 5, 6 and 8 the lead engaging perimeters of these plates 192 are eccentric, being above the roots of the teeth 56 and above the tapes BT in the vicinity of component reception, and gradually letting components descend into the roots of the teeth in the vicinity of the presser rolls 176 before extending outwardly from the shaft 148 and thus serving to strip the bound components from the pick-off wheels and the pitch wheels.

The features of the present invention contribute considerably to the maintenance of high volume output while attaining more uniformly bound components and providing the added versatility and reliability of operation required in commercial work.

Having thus described my invention what I claim as new and desire to secure by Letters Patent of the United States is:

In combination with a conveyor for carrying components of the axial lead type successively to and through a belting zone, mechanism for variably equispacing components on said conveyor, said mechanism comprising a raceway for holding a supply of the components, a separator device comprising lead engaging members cooperative with the raceway for controlling release of the components seriatim to a delivery chute, means for operating the separator device, and mechanism including a lever connected to said device operating means and a link interconnecting the conveyor and the lever for intermittently moving the conveyor to present successively equi-spaced portions thereof in register with said chute, and means for adjustably connecting the lever and the link to permit a change in the increments and speed of movement of the conveyor whereby the equi-spacing in which the components are to be belted may be variably selected.

References Cited in the file of this patent
UNITED STATES PATENTS

| | | |
|---|---|---|
| 1,783,806 | Loebe et al. | Dec. 2, 1930 |
| 2,162,138 | Tuthill et al. | June 13, 1939 |
| 2,192,503 | Newman | Mar. 5, 1940 |
| 2,572,164 | Lehmann | Oct. 23, 1951 |
| 2,771,206 | Daniels et al. | Nov. 20, 1956 |
| 2,835,372 | Biddison | May 20, 1958 |